United States Patent Office 3,232,942
Patented Feb. 1, 1966

3,232,942
1-SUBSTITUTED (+)-LYSERGOL
Albert Hofmann and Franz Troxler, Bottmingen, Switzerland, assignors to Sandoz Ltd. (a/k/a Sandoz A.G.), Basle, Switzerland
No Drawing. Filed June 2, 1964, Ser. No. 372,110
5 Claims. (Cl. 260—285.5)

The present invention relates to new heterocyclic alcohols.

This application forms a continuation-in-part of our co-pending application Serial No. 161,282, filed December 21, 1961, and now abandoned.

The new compounds correspond to the general Formula I

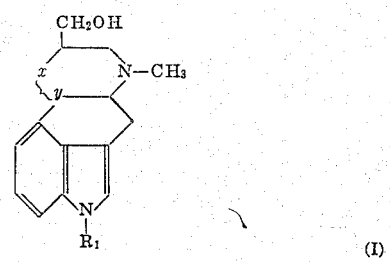

wherein $R_1$ signifies a member selected from the group consisting of an alkyl containing from 1 to 4 carbon atoms inclusive, an alkenyl containing from 2 to 4 carbon atoms inclusive, an aralkyl containing from 7 to 10 carbon atoms inclusive, and $$\overset{\frown}{x \quad y}$$

signifies a member selected from the group consisting of $$-CH=C\diagup$$

and $$-CH_2-CH\diagup$$

groupings.

The acid addition salts of compounds I and pharmaceutical compositions containing, in addition to an inert carrier, a compound I and/or an acid addition salt thereof are also part of the present invention.

The present invention also provides a process for the production of the new compounds I and their acid addition salts which is characterised in that a compound of the general Formula II,

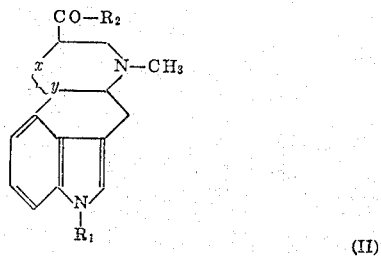

wherein $R_1$ and $$\overset{\frown}{x \quad y}$$

have the above significance and $R_2$ signifies a member selected from the group consisting of alkoxy, aralkoxy and 3,5-dialkyl-pyrazolyl-(1), is reduced and, when an acid addition salt is desired, salification is effected with an organic or inorganic acid.

When the starting material II contains a double bond in position 9, 10 and an end product I having this double bond is required, the reduction of compound II is effected with a complex hydride, preferably lithium aluminium hydride in an inert organic solvent: For example, a solution of 1-methyl-D-lysergic acid methyl ester in an inert solvent, e.g. tetrahydrofuran, dioxane or ethyl-morpholine, is reduced with at least 0.5 mol of lithium aluminium hydride. An excess of reducing agent is, however, not detrimental. The reduction is preferably effected at a temperature of 20–80° C. The resulting complex as well as any excess reducing agent present are decomposed with methanol. After the addition of a saturated inorganic metal salt solution the mixture is filtered and the residue washed with an inert organic solvent, e.g. chloroform or a methanolic ether solution, the combined filtrate dried over potassium carbonate and evaporated to dryness, and the residue purified by crystallisation and/or chromatography.

In the process of the invention, when a compound I in which $$\overset{\frown}{x \quad y}$$

signifies the radical $$-CH_2-CH\diagup$$

is required, the reduction of compound II may be effected with sodium in alcoholic solution. This reduction is effected, for example, by adding sodium to a boiling solution of compound II in an alcohol, e.g. ethanol, isopropanol or methylamyl alcohol. Upon completion of the reduction, the alcohol is evaporated, water carefully added and the mixture shaken with a water immiscible solvent, preferably chloroform or methylene chloride, purification of compound I being effected by crystallisation and/or chromatography.

Compounds I form stable, crystalline salts with inorganic or organic acids, e.g. hydrochloric, hydrobromic, sulphuric, citric, oxalic, tartaric, succinic, maleic, malic, acetic, benzoic, hexahydrobenzoic, methanesulphonic, fumaric, gallic and hydriodic acid.

The compounds I have a positive Keller's and Van Urk's colour reaction; they are slightly soluble in water, generally easily soluble in polar organic solvents but difficultly soluble in benzene or petroleum ether.

The compounds I exhibit a marked and unexpectedly powerful serotonin inhibiting effect. Thus, for example, (+)-1-methyl lysergol is more than 13 times more potent than (+)-lysergol. The fact that methylation would increase the effectiveness of the lysergol to such an extent was not to be expected as N-substitution of compounds of the lysergic acid series sometimes enhances their properties and sometimes has a detrimental effect thereon (1-methyl ergotamine is, for example, a less potent serotonin inhibitor than ergotamine).

In addition to their increased serotonin inhibiting effect, the compounds I display a further, highly advantageous effect which, in contrast to the known compounds, makes them especially suitable for pharmaceutical administration. The (+)-lysergol exhibits a pyretogenic effect in that it causes a rise in body temperature. It has now, however, been found that the compounds I exhibit a most unusual and completely unexpected inverse pyretogenic effect in that their administration causes a lowering of body temperature. Thus, for example, while the administration of 0.05 to 0.2 mg. per kg. of (+)-lysergol causes a progressive pyretogenic effect in the case of unanesthetized rabbits (rectal temperature measured thermo-electrically) the administration of 0.1 to 2.0 mg. per kg. of (+)-1-methyl lysergol causes progressive lowering of the temperature. This inverse pyretogenic effect is of great practical importance for it allows the compounds to be administered for the purpose of serotonin inhibition without raising the body temperature, something which was not possible with, and thus precluded the use of the hitherto known compounds.

Further pharmaceutical properties exhibited by compound I are a beneficial effect on the psyche, rheumatism, allergies, inflammations or migraine.

In addition to their unexpected therapeutic properties, the compounds I also have an important and remarkably low toxicity. Thus, for example, tests performed on mice according to the up and down method with (+)-lysergol and (+)-1-methyl lysergol, dissolved in aqueous tartaric acid, showed the $LD_{50}$ values for the former to be more than 50 times less than for the latter ($LD_{50}$ (+)-lysergol 0.32 mg. per kg., $LD_{50}$ (+)-1-methyl lysergol, 18 mg. per kg.).

Compounds II, in which $R_2$ signifies an alkoxy or aralkoxy radical, may be produced by alkylating or alkenylating a corresponding ester which is unsubstituted in the 1-position. Alternatively they may be obtained by converting a corresponding lysergic acid or dihydrolysergic acid alkylated or alkenylated in the 1-position to the corresponding acid halide and esterifying this with the desired alcohol; the said acid itself is obtained by alkaline saponification of an ergot alkaloid substituted in the 1-position, e.g. 1-methyl-ergotamine.

Compounds II, wherein $R_2$ signifies an alkoxy or aralkoxy radical may be produced by reacting with hydrazine an ergot alkaloid substituted in the 1-position, e.g. 1-methyl-ergotamine, converting the resulting lysergic acid hydrazide substituted in the 1-position with nitrous acid to form the azide and reacting this with an alcohol of general formula $R_2OH$, in which $R_2$ signifies an alkyl or aralkyl radical.

Compounds II in which $R_3$ signifies a 3,5-dialkyl-pyrazolyl-(1)-radical may, for example, be produced as follows: A corresponding hydrazide of the lysergic acid or dihydrolysergic acid series is reacted with a β-diketone of general Formula III

alkyl—CO—CH$_2$—CO—alkyl       (III)

in a water miscible ether, e.g. dimethoxy-ethane or tetrahydrofuran, at room temperature in the presence of 1–2 mols of an inorganic acid, preferably hydrochloric acid.

In the following non-limitative examples, all temperatures are stated in degrees centigrade and are uncorrected.

*Example 1.—1-methyl-D-lysergol*

A solution of 1.0 g. of 1-methyl-D-lysergic acid methyl ester in 100 cc. of absolute tetrahydrofuran are added to 0.5 g. of lithium aluminium hydride in 10 cc. of absolute tetrahydrofuran whilst stirring. The reaction mixture is then kept at an oil bath temperature of 40° for one hour with continuous stirring and in an atmosphere of nitrogen. The mixture is then cooled and the resulting complex and excess lithium aluminum hydride decomposed with 1 cc. of methanol. After addition of 3 cc. of water, 10 g. of potassium carbonate and 5 g. of highly purified fuller's earth, the mixture is filtered and the residue washed with a 3% methanolic ethereal solution. The combined filtrate, dried over potassium carbonate, is concentrated in a vacuum. The resulting yellow oil crystallises upon treatment with a little methylene chloride/methanol. After recrystallising twice from the same solvent mixture, crystals having a light yellow colour result. Melting point 222–223° (decomposition), $$[\alpha]_D^{20}=+36.6°$$

(c.=0.575 in pyridine).

The 1-methyl-D-lysergic acid methyl ester used as a starting material is produced as follows:

5 g. of 1-methyl-ergotamine and 12.5 g. of barium hydroxide are heated at reflux in 20 cc. of ethanol and 20 cc. of water in the presence of 0.25 g. of sodium dithionite for two hours. After cooling, 50 cc. of concentrated ammonia are added, the barium precipitated as sulphate, the mixture is filtered and the filtrate concentrated to 50 cc., 1.7 g. of a mixture of 1-methyl-D-lysergic acid and 1-methyl-D-isolysergic acid crystallising. This mixture is suspended in 100 cc. of methanol, hydrogen chloride passed through, whilst cooling with ice, until complete dissolution has occurred, the mixture stirred for a further half hour at room temperature, poured onto ice and the mixture then shaken between chloroform and a dilute sodium bicarbonate solution. Upon evaporation of the chloroform solution the ester remains as a yellow oil, which is reduced with lithium aluminium hydride in accordance with the above method, without purification.

*Example 2.—1-allyl-D-lysergol*

2.6 g. of lithium aluminium hydride in 100 cc. of ether are added dropwise to a solution of 3 g. of 1-allyl-D-lysergic acid methyl ester in 100 cc. of absolute ether whilst stirring and the mixture stirred for a further three hours at room temperature. The complex and the excess hydride are then decomposed by the dropwise addition of methanol and 250 cc. of water are then added. The solution is then saturated with carbon dioxide and 150 g. of potash added, the ethereal phase separated and the aqueous phase shaken twice with either. The combined ethereal extracts dried over potash are evaporated to dryness and the crude product of 1-allyl-D-lysergol and 1-allyl-D-isolysergol is chromatographed on a column of 85 g. of aluminium oxide. Using absolute chloroform for eluting, the 1-allyl-D-isolysergol is first washed into the filtrate and then the 1-allyl-D-lysergol which is obtained as an oil which could not be recrystallised.

1-allyl-lysergol bimaleate: from ethanol prisms having a melting point of 155–158°; $[\alpha]_D^{20}=+21°$ (c.=0.25 in water). Keller's colour reaction: first a dull violet becoming olive brown within ½ minute; Van Urk's colour reaction: rose red.

The 1-allyl-D-lysergic acid methyl ester used as a starting material is prepared as follows:

D-lysergic acid in liquid ammonia is reacted with sodium amide and allyl bromide, the ammonia evaporated, the residue taken up in water and the solution brought to a pH value of 4–6 by the addition of acetic acid. The oily 1-allyl-D-lysergic acid separating is then crystallized from methanol. Melting point: 209–211°. $[\alpha]_D^{20}=+99°$ (c.=0.5 in 0.1 N methanesulphonic acid). An excess of an ethereal diazomethane solution is added to a suspension of 1-allyl-D-lysergic acid in methanol; after completion of the nitrogen evolution the mixture is evaporated to dryness and the remaining oily 1-allyl-D-lysergic acid methyl ester is not further purified.

*Example 3.—1-methyl-9,10-dihydro-D-lysergol*

A solution of 1.33 g. of 1-methyl-9,10-dihydro-D-lysergic acid methyl ester (melting point 115–116°) in 100 cc. of absolute tetrahydrofuran are added to 1.0 g. of lithium aluminium hydride in 10 cc. of absolute tetrahydrofuran whilst stirring. The process is further effected as described in Example 1. After evaporation of the solvent the resulting faintly yellow coloured oil is made to crystallise by the addition of methylene chloride/methanol. After recrystallising three times from the same solvent mixture colourless crystals, having a melting point of 253–253.5° result. $[\alpha]_D^{20}=-97.3°$ (c.=0.5 in pyridine).

*Example 4.—1-methyl-9,10-dihydro-D-lysergol*

1 g. of 1-methyl-9,10-dihydro-D-lysergic acid methyl ester is dissolved in 50 cc. of boiling absolute butanol, 2.5 g. of sodium quickly added and the mixture shaken vigorously at boiling point until all the sodium has dissolved, whereupon a further 25 cc. of butanol containing 1 g. of sodium are added and this left to react in the same manner. After all the metal has dissolved, 50 cc. of ice water are added, the mixture saturated with carbonic acid, the mixture evaporated to dryness in a vacuum

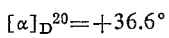

and the dry residue extracted with ethanol. The crude 1-methyl-9,10-dihydro-D-lysergol resulting by the evaporation of ethanol is subsequently crystallised from methylene chloride/methanol. Melting point 253°; $[\alpha]_D^{20} = -97°$ (c.=0.5 in pyridine). Keller's colour reaction: blue.

*Example 5.—1-methyl-9,10-dihydro-D-lysergol*

2 g. of 1-methyl-9,10-dihydro-D-lysergyl-(3',5'-dimethyl-pyrazole) are stirred with 0.5 g. of LiAlH₄ for two hours in ether, the complex and excess reducing agent are then decomposed with methanol and water, the mixture is filtered, the residue washed with chloroform and the filtrate evaporated to dryness. Upon crystallization from chloroform/ether the dry residue yields 1-methyl-9,10-dihydro-D-lysergol as a colourless crystallate having a melting point of 252–253°; $[\alpha]_D^{20} = -97°$ (c.=0.5 in pyridine). The 1-methyl-9,10-dihydro-D-lysergyl-(3',5'-dimethyl-pyrazole) used as a starting material is prepared as follows: 1-methyl-dihydro-ergotamine is heated with anhydrous hydrazine for a number of hours at reflux and the 1-methyl-9,10-dihydro-D-lysergic acid hydrazide, crystallizing spontaneously upon cooling, is filtered off. Colourless needles having a melting point of 259–262° result. $[\alpha]_D^{20} = -118°$ (c.=0.5 in pyridine). For the conversion to the pyrazole 2.96 g. of 1-methyl-9,10-dihydro-D-lysergic acid hydrazide are left to stand in 12 cc. of a 1 N hydrochloric acid containing 7 cc. of dimethoxymethane with 1.35 g. of acetylacetone for 3 hours at room temperature, the mixture is neutralized with 12 cc. of a 1 N sodium hydroxide solution, shaken with chloroform and the pyrazole crystallized by the addition of ether after strongly concentrating the chloroform solution. Melting point 148–150°; $[\alpha]_D^{20} = -90°$ (c.=0.5 in pyridine).

*Example 6.—1-benzyl-D-lysergol*

2.84 g. of 1-benzyl-D-lysergic acid methyl ester are boiled at reflux with 2.4 g. of LiAlH₄ in 350 cc. of absolute ether for 3 hours, the complex and the excess reducing agent then decomposed with 10 cc. of methanol, 20 cc. of a saturated sodium sulphate solution added and the mixture filtered. The filter residue is washed a number of times with warm chloroform, the combined filtrates are dried over magnesium sulphate, evaporated to dryness in a vacuum and the residue (2.65 g.), consisting of a mixture of 1-benzyl-D-lysergol and 1-benzyl-D-isolysergol, is chromatographed on a column of 80 g. of aluminium oxide. First the 1-benzyl-D-isolysergol is washed into the filtrate with absolute chloroform and then the 1-benzyl-D-lysergol with chloroform containing 0.1–0.5% alcohol. For the purpose of converting the 1-benzyl-D-lysergol to the bimaleate, 1.26 g. of base and 0.47 g. of maleic acid are dissolved in methanol and ether is added until crystallization commences.

On crystallization from methanol 1-benzyl-D-lysergol bimaleate forms colourless prisms which start to decompose from 148° and do not have a definite melting point even on further heating. $[\alpha]_D^{20} = +51°$ (c.=0.5 in water). Keller's colour reaction: brown with slight red tinge; Van Urk's colour reaction: rose red.

The 1-benzyl-D-lysergic acid methyl ester is produced as follows: 5 g. of D-lysergic acid are benzylated in liquid ammonia with 1.45 g. of sodium amide and 8 g. of benzyl bromide, the ammonia evaporated and the 1-benzyl-D-lysergic acid separated as a brown amorphous mass by dissolving the residue in water and bringing the solution to a pH value of 5–6 with acetic acid. This mass is dissolved in methanol without further purification and esterified with an excess of ethereal diazomethane solution. The crude 1-benzyl-D-lysergic acid methyl ester is purified by chromatography on aluminium oxide and then reduced in the above described manner.

Having thus disclosed the invention what is claimed is:

1. A compound selected from the group consisting of heterocyclic alcohols of the formula,

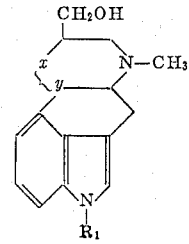

wherein $R_1$ signifies a member selected from the group consisting of alkyl of 1 to 4 carbon atoms inclusive, alkenyl of 2 to 4 carbon atoms inclusive, benzyl, and

signifies a member selected from the group consisting of

and

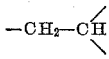

groupings and their acid addition salts.
2. 1-methyl-D-lysergol.
3. 1-allyl-D-lysergol.
4. 1-methyl-9,10-dihydro-D-lysergol.
5. 1-benzyl-D-lysergol.

References Cited by the Examiner

FOREIGN PATENTS 674,061  6/1952  Great Britain.

OTHER REFERENCES

Burger: "Medicinal Chemistry" (1960), page 622 relied upon.

IRVING MARCUS, *Primary Examiner.*

NICHOLAS S. RIZZO, *Examiner.*